(12) United States Patent
Kase et al.

(10) Patent No.: US 8,307,059 B2
(45) Date of Patent: Nov. 6, 2012

(54) NETWORK SYSTEM, CONTROL APPARATUS, TERMINAL APPARATUS, AND CONNECTION STATE DETERMINING METHOD

(75) Inventors: Hiroshi Kase, Osaka (JP); Junji Yoshida, Osaka (JP); Takayuki Fukui, Osaka (JP)

(73) Assignee: Panasonic Corporation, Osaka (JP)

( * ) Notice: Subject to any disclaimer, the term of this patent is extended or adjusted under 35 U.S.C. 154(b) by 274 days.

(21) Appl. No.: 12/681,163

(22) PCT Filed: Aug. 12, 2008

(86) PCT No.: PCT/JP2008/002201
§ 371 (c)(1),
(2), (4) Date: Apr. 1, 2010

(87) PCT Pub. No.: WO2009/044500
PCT Pub. Date: Apr. 9, 2009

(65) Prior Publication Data
US 2010/0223370 A1    Sep. 2, 2010

(30) Foreign Application Priority Data
Oct. 5, 2007 (JP) ................. 2007-261731

(51) Int. Cl.
*G06F 15/173* (2006.01)

(52) U.S. Cl. ............. 709/223; 709/245; 348/705

(58) Field of Classification Search ........... 709/223, 709/245; 348/705
See application file for complete search history.

(56) References Cited

U.S. PATENT DOCUMENTS

| | | | |
|---|---|---|---|
| 2003/0039260 A1 | 2/2003 | Fujisawa | |
| 2004/0151189 A1 | 8/2004 | Ohkita | |
| 2006/0001776 A1* | 1/2006 | Araki | 348/705 |
| 2006/0256241 A1 | 11/2006 | Suzuki et al. | |
| 2006/0274203 A1* | 12/2006 | Naganuma et al. | 348/554 |
| 2007/0067431 A1 | 3/2007 | Yoshihara et al. | |
| 2007/0226620 A1* | 9/2007 | Togashi | 715/700 |
| 2008/0062600 A1* | 3/2008 | Crawley et al. | 361/56 |
| 2008/0212525 A1* | 9/2008 | Tervonen et al. | 370/329 |
| 2008/0297371 A1* | 12/2008 | Ida | 340/825.52 |
| 2009/0157885 A1* | 6/2009 | Takatsuji et al. | 709/228 |

(Continued)

FOREIGN PATENT DOCUMENTS

EP    1 657 916    5/2006

(Continued)

OTHER PUBLICATIONS

International Search Report issued Sep. 22, 2008 in International (PCT) Application No. PCT/JP2008/002201.

(Continued)

*Primary Examiner* — Tesfay Yohannes
(74) *Attorney, Agent, or Firm* — Wenderoth, Lind & Ponack, L.L.P.

(57) ABSTRACT

A network system according to an implementation of the present invention involves: determining whether or not a matching address is found by comparing (i) an apparatus address, of an apparatus connected to an HDMI network, which is obtained via the HDMI network with (ii) an apparatus address, of an apparatus connected to another network, which is obtained via the other network (S44). Here, the matching address represents a match between the apparatuses addresses. When determining that the matching address is found, the implementation of the present invention involves determining that the terminal apparatus having the matching address is connected to a control apparatus via both of the HDMI network and the other network (S46).

12 Claims, 10 Drawing Sheets

U.S. PATENT DOCUMENTS

| | | | |
|---|---|---|---|
| 2009/0190040 A1* | 7/2009 | Watanabe et al. | 348/725 |
| 2009/0210539 A1* | 8/2009 | Funabiki et al. | 709/228 |
| 2009/0262135 A1* | 10/2009 | Huston et al. | 345/629 |
| 2009/0262257 A1* | 10/2009 | Baurmann et al. | 348/739 |
| 2010/0223370 A1* | 9/2010 | Kase et al. | 709/223 |
| 2010/0263006 A1* | 10/2010 | Matsuyama | 725/109 |

FOREIGN PATENT DOCUMENTS

| | | |
|---|---|---|
| JP | 2000-172600 | 6/2000 |
| JP | 2003-60662 | 2/2003 |
| JP | 2004-222263 | 8/2004 |
| JP | 2006-343908 | 12/2006 |
| JP | 2007-53530 | 3/2007 |
| JP | 2007-200415 | 8/2007 |
| JP | 2008-17020 | 1/2008 |
| WO | 2005/015901 | 2/2005 |
| WO | 2009/016936 | 2/2009 |

OTHER PUBLICATIONS

Supplemental European Search Report, issued Jan. 27, 2011 in EP Application 08 79 0449.6.

* cited by examiner

| Function name | HDMI (Priority) | IP |
|---|---|---|
| Reproduction | Executable | Executable |
| Dubbing | Executable | Inexecutable |
| Displaying list of recording | Executable | Executable |
| ⋮ | ⋮ | ⋮ |

NETWORK SYSTEM, CONTROL APPARATUS, TERMINAL APPARATUS, AND CONNECTION STATE DETERMINING METHOD

TECHNICAL FIELD

The present relates to a control apparatus and an apparatus which is connected to the control apparatus via at least one of a High Definition Multimedia Interface (HDMI) network and another network.

BACKGROUND ART

Under further digitalization and development of networking, audio and visual (AV) apparatuses, such as a TV and a recorder are getting connected via a digital interface. Some apparatuses even have two or more interfaces. In some cases, for example, a TV and a recorder can be connected via both an IEEE 1394 digital interface and an HDMI.

Here, the TV cannot determine whether the IEEE 1394 interface and the HDMI are connected to the same apparatus or each of the IEEE 1394 interface and the HDMI is connected to a different apparatus. Thus, this is troublesome for the user since he or she has to recognize the connection state of the apparatus before operating the TV.

Patent Reference 1 discloses a technique to solve the above problem. According to the technique, the TV issues, for example, a command to the recorder via the IEEE 1394 interface in order to start reproduction. Then, the TV observes the change of a HDMI signal to see whether or not the TV can detect a signal in response to the issued reproduction command, so that the TV determines whether or not both of the IEEE 1394 interface and the HDMI are connected to the same recorder.

Patent Reference 1: International Patent Publication No. WO 05/15901

DISCLOSURE OF INVENTION

Problems that Invention is to Solve

The technique disclosed in Patent Reference 1, which uses the IEEE 1394 interface and the HDMI, is effective only when a closed connection state is observed in a single HDMI network, as shown in FIG. 1. The reasons are described below.

A transmission distance is short in the IEEE 1394 network. Thus, when apparatuses, set in respective rooms in a house, are mutually connected, employed is the Internet Protocol (IP) network connecting the apparatus via, for example, an Ethernet (registered trademark) cable. Here, in the case of the connection state such that several HDMI networks are mutually connected within the IP network, as shown in FIG. 2, the technique disclosed in Patent Reference 1 is not applicable.

In recovery from a power failure, for example, assumed in FIG. 2 is that connection check sequences are simultaneously executed (i) from a TV 1A to a recorder 4A, and (ii) from TV 3A to a recorder 2A. Here, the TV 1A and the recorder 4A are not connected via the HDMI, and neither are the TV 3A and the recorder 2A. Still, each of the TV 1A and the TV 3A is determined to be directly connected via the HDMI to the recorder 4A and the recorder 2A, respectively, due to false recognition caused by the reasons below.

In the HDMI network, a TV always acts as a route, and an address is assigned to an apparatus, such as a recorder connected to the TV via the HDMI. Thus, the same address value is highly likely assigned to both the recorders 2A and 4A.

Assumed here is that: the same address value is assigned to the recorders 2A and 4A; and the TVs 1A and 3A respectively issue a command to the recorders 4A and 2A via the IP network.

Here, the TV 1A issues the command to the recorder 4A via the IP network, a response signal is transmitted from the recorder 4A to the TV 3A via the HDMI network. Thus, upon issuing the command to the recorder 2A via the IP network, the TV 3A detects the response signal transmitted from the recorder 4A. Here, in the HDMI network, the recorder 4A shares the same address value with the recorder 2A.

Hence, the TV 3A falsely recognizes that the TV 3A and the recorder 2A are connected via the HDMI network. In other words, neither the TV 3A nor the TV 1A can correctly determine which recorder (apparatus) is connected to the TV 3A or the TV 1A via both of the networks; namely the IP network and the HDMI network. In the case of the connection state where several HDMI networks are mutually connected via the IP network, as shown in FIG. 2, the conventional technique disclosed in Patent Reference 1 faces a problem in that the TV cannot correctly identify an apparatus connected to the TV itself via the two networks.

The present invention is conceived in view of the above problems and has as an object to provide a network system, a control apparatus, a terminal apparatus, and a connection state determining method which are capable of correctly determining a connection state between several apparatuses in the case where there are several networks.

Means to Solve the Problems

In order to solve the above problems, a network system according to an aspect of the present invention includes a control apparatus and one or more terminal apparatuses which are connected via a High Definition Multimedia Interface (HDMI) network. The control apparatus is connected to at least one of the one or more terminal apparatuses via another network which is different from the HDMI network. The network system includes in the control apparatus: a first address obtaining unit which obtains an apparatus address via the other network, the apparatus address representing an address of an apparatus connected to the other network; a second address obtaining unit which obtains an apparatus address via the HDMI network, the apparatus address representing an address of the at least one terminal apparatus connected to the HDMI network; an address determining unit which determines whether or not a matching address is found by comparing (i) the apparatus address obtained by the first address obtaining unit with (ii) the apparatus address obtained by the second address obtaining unit, the matching address representing a match between the apparatus addresses; and a connection determining unit which determines that a terminal apparatus having the matching address is connected to the control apparatus via both of the other network and the HDMI network in the case where the address determining unit determines that the matching address is found. The network system includes, in each of the one or more terminal apparatuses: an address holding unit which holds an apparatus address corresponding to each of the one or more terminal apparatuses; a first transmitting unit which transmits the apparatus address to the control apparatus via the other network in response to a request from the control apparatus, the apparatus address being held in the address holding unit; and a second transmitting unit which transmits the apparatus address to the control apparatus via the HDMI network in response to a request from the control apparatus, the apparatus address being held in the address holding unit.

In other words, the aspect of the present invention involves: determining whether or not a matching address is found by comparing (i) an apparatus address, of an apparatus connected to an HDMI network, which is obtained via the HDMI network with (ii) an apparatus address, of an apparatus connected to another network, which is obtained via the other network. Here, the matching address represents a match between the apparatuses addresses. When determining that the matching address is found, the aspect of the present invention involves determining that the terminal apparatus having the matching address is connected to a control apparatus via both of the HDMI network and the other network. Thus, the aspect of the present invention successfully determines a connection state between several apparatuses in the case where there are several networks.

Preferably, the control apparatus further includes a displaying unit which displays a single icon indicating the terminal apparatus having the matching address instead of two icons each corresponding to an associated one of the HDMI network and the other network in the case where the address determining unit determines that the matching address is found, the two icons each indicating the terminal apparatus having the matching address.

Preferably, each of the one or more terminal apparatuses has functions to be executed via one of the other network and the HDMI network, and the control apparatus includes: a storage unit which stores function information indicating which one of the other network and the HDMI network is used as a priority for each of the functions; and a selective communicating unit which: selects one of the other network and the HDMI network according to a function executed by the terminal apparatus having the matching address and the function information corresponding to the terminal apparatus having the matching address; and communicates with the terminal apparatus having the matching address via the selected one of the other network and the HDMI network, in the case where the address determining unit determines that the matching address is found.

In other words, a network is selected according to the function which the terminal apparatus executes. Thus, in the case where one network needs to be selected when each of apparatuses is connected via several networks, the aspect of the present invention keeps the user away from a troublesome task, such as selecting the network.

Preferably, the other network is an Internet Protocol (IP) network.

Preferably, the apparatus address is a Media Access Control (MAC) address.

A control apparatus, according to another aspect of the present invention, is connected to (i) one or more terminal apparatuses via a High Definition Multimedia Interface (HDMI) network, and (ii) at least one of the one or more terminal apparatuses via an other network which is different from the HDMI network. The control apparatus includes: a first address obtaining unit which obtains an apparatus address via the other network, the apparatus address representing an address of an apparatus connected to the other network; a second address obtaining unit which obtains an apparatus address via the HDMI network, the apparatus address representing an address of the at least one terminal apparatus connected to the HDMI network; an address determining unit which determines whether or not a matching address is found by comparing (i) the apparatus address obtained by the first address obtaining unit with (ii) the apparatus address obtained by the second address obtaining unit, the matching address representing a match between the apparatus addresses; and a connection determining unit which determines that a terminal apparatus having the matching address is connected to the control apparatus via both of the other network and the HDMI network in the case where the address determining unit determines that the matching address is found.

In other words, the aspect of the present invention involves: determining whether or not a matching address is found by comparing (i) an apparatus address, of an apparatus connected to an HDMI network, which is obtained via the HDMI network with (ii) an apparatus address, of an apparatus connected to another network, which is obtained via the other network. Here, the matching address represents a match between the apparatuses addresses. When determining that the matching address is found, the aspect of the present invention involves determining that the terminal apparatus having the matching address is connected to a control apparatus via both of the HDMI network and the other network. Thus, aspect of the present invention successfully determines a connection state between several apparatuses in the case where there are several networks.

Preferably, the control apparatus further includes a displaying unit which displays a single icon indicating the terminal apparatus having the matching address instead of two icons each corresponding to an associated one of the HDMI network and the other network in the case where the address determining unit determines that the matching address is found, the two icons each indicating the terminal apparatus having the matching address.

Preferably, the control apparatus further includes: a storage unit which stores function information indicating which one of the other network and the HDMI network is used as a priority for each of the functions which each of the one or more terminal apparatuses has; and a selective communicating unit which: selects one of the other network and the HDMI network according to a function executed by the terminal apparatus having the matching address and the function information corresponding to the terminal apparatus having the matching address; and communicates with the terminal apparatus having the matching address via the selected one of the other network and the HDMI network, in the case where the address determining unit determines that the matching address is found.

In other words, a network is selected according to the function which the terminal apparatus executes. In other words, a network is selected according to the function which the terminal apparatus executes. Thus, in the case where one network needs to be selected when each of apparatuses is connected via several networks, the aspect of the present invention keeps the user away from a troublesome task, such as selecting the network.

Preferably, the other network is an Internet Protocol (IP) network.

Preferably, the apparatus address is a Media Access Control (MAC) address.

A terminal apparatus, according to another aspect of the present invention, is connected to an external apparatus via a High Definition Multimedia Interface (HDMI) network and another network which is different from the HDMI network. The terminal apparatus includes: an address holding unit which holds an apparatus address of the terminal apparatus; a first transmitting unit which transmits the apparatus address to the external apparatus via the other network in response to a request from the external apparatus, the apparatus address being held in the address holding unit; and a second transmitting unit which transmits the apparatus address to the external apparatus via the HDMI network in response to a request from the external apparatus, the apparatus address being held in the address holding unit.

Preferably, the other network is an Internet Protocol (IP) network.

Preferably, the apparatus address is a Media Access Control (MAC) address.

A method for determining a connection state, according to another aspect of the present invention, is employed in a network system in which a control apparatus and one or more terminal apparatuses are connected via a High Definition Multimedia Interface (HDMI) network. The control apparatus is connected to at least one of the one or more terminal apparatuses via another network which is different from the HDMI network. The method includes: first obtaining an apparatus address by the control apparatus via the other network, the apparatus address representing an address of an apparatus connected to the other network; and second obtaining an apparatus address by the control apparatus via the HDMI network, the apparatus address representing an address of the at least one terminal apparatus connected to the HDMI network; determining, by the control apparatus, whether or not a matching address is found by comparing (i) the apparatus address obtained in the first obtaining with (ii) the apparatus address obtained in the second obtaining, the matching address representing a match between the apparatus addresses; and determining, by the control apparatus, that a terminal apparatus having the matching address is connected to the control apparatus via both of the other network and the HDMI network in the case where the matching address is found in the determining whether or not the matching address is found.

In other words, the aspect of the present invention involves: determining whether or not a matching address is found by comparing (i) an apparatus address, of an apparatus connected to an HDMI network, which is obtained via the HDMI network with (ii) an apparatus address, of an apparatus connected to another network, which is obtained via the other network. Here, the matching address represents a match between the apparatuses addresses. When determining that the matching address is found, the aspect of the present invention involves determining that the terminal apparatus having the matching address is connected to a control apparatus via both of the HDMI network and the other network. Thus, the aspect of the present invention successfully determines a connection state between several apparatuses in the case where there are several networks.

Preferably, the other network is an Internet Protocol (IP) network.

Preferably, the apparatus address is a Media Access Control (MAC) address.

It is noted that the present invention may also be implemented as a computer-executable program which executes processes executed in a method for determining a connection state. In addition, the present invention may be implemented as a computer-readable recording medium which stores the program and an integrated circuit.

Effects of the Invention

An aspect of the present invention involves: determining whether or not a matching address is found by comparing (i) an apparatus address, of an apparatus connected to an HDMI network, which is obtained via the HDMI network with (ii) an apparatus address, of an apparatus connected to another network, which is obtained via the other network. Here, the matching address represents a match between the apparatuses addresses. When determining that the matching address is found, the aspect of the present invention involves determining that the terminal apparatus having the matching address is connected to a control apparatus via both of the HDMI network and the other network.

Thus, the present invention successfully determines a connection state between several apparatuses in the case where there are several networks.

BRIEF DESCRIPTION OF DRAWINGS

FIG. 5 exemplifies a function data table.

NUMERICAL REFERENCES

Figure 1:
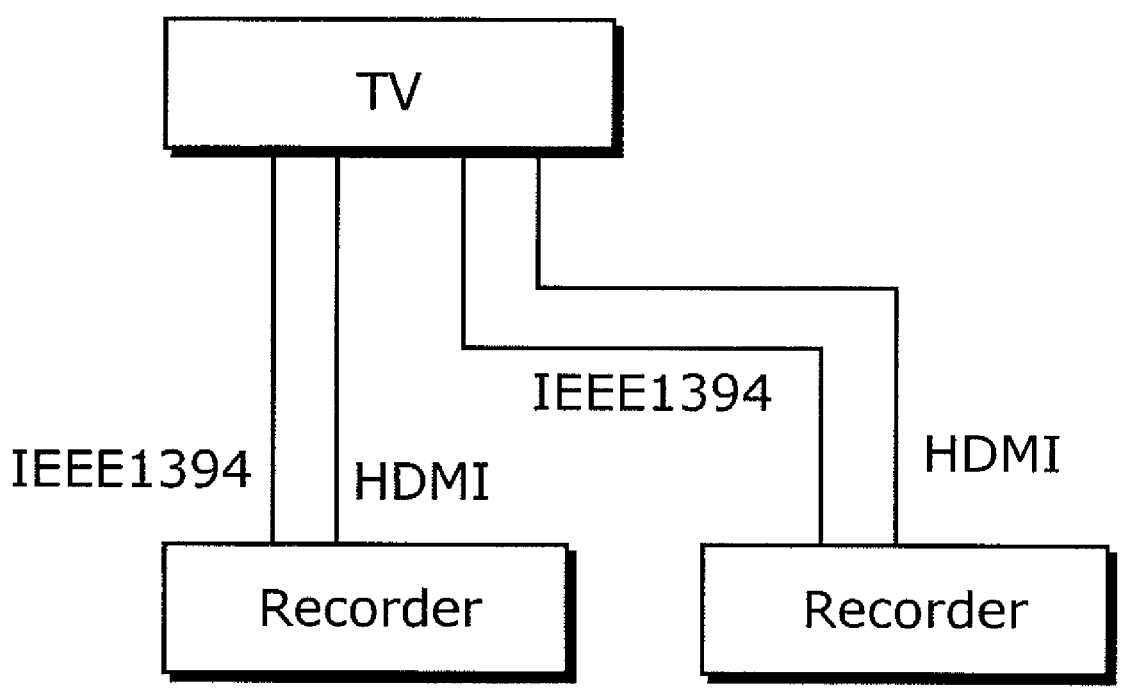
FIG. 1 exemplifies a schematic view of a network structure.
Figure 2:
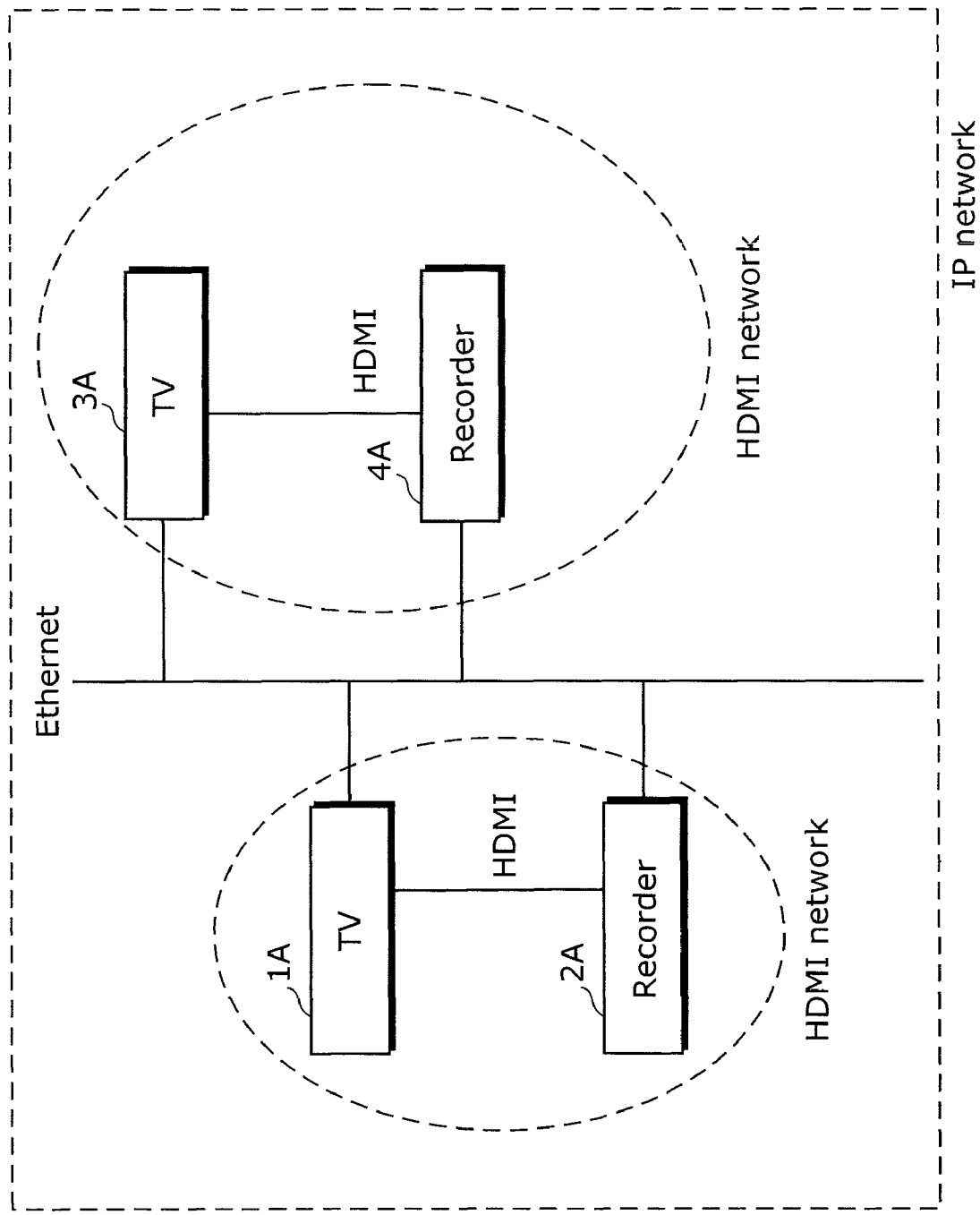
FIG. 2 shows a connection state between apparatuses in the case where there are several different networks.

1 TV
2 Recorder
3 TV
4 Recorder
5 Recorder
6 HDMI network
7 HDMI network
11 HDMI control unit
12 Ethernet (registered trademark) control unit
13 Control unit
14 Connection determining unit
15 Displaying unit
21 HDMI control unit
22 Ethernet (registered trademark) control unit
23 Responding unit
24 MAC address obtaining unit
25 MAC address holding unit
30 HDMI cable
31 Ethernet (registered trademark) cable

BEST MODE FOR CARRYING OUT THE INVENTION

Described hereinafter are Embodiments of the present invention with reference to the drawings.

Embodiment

Figure 3:
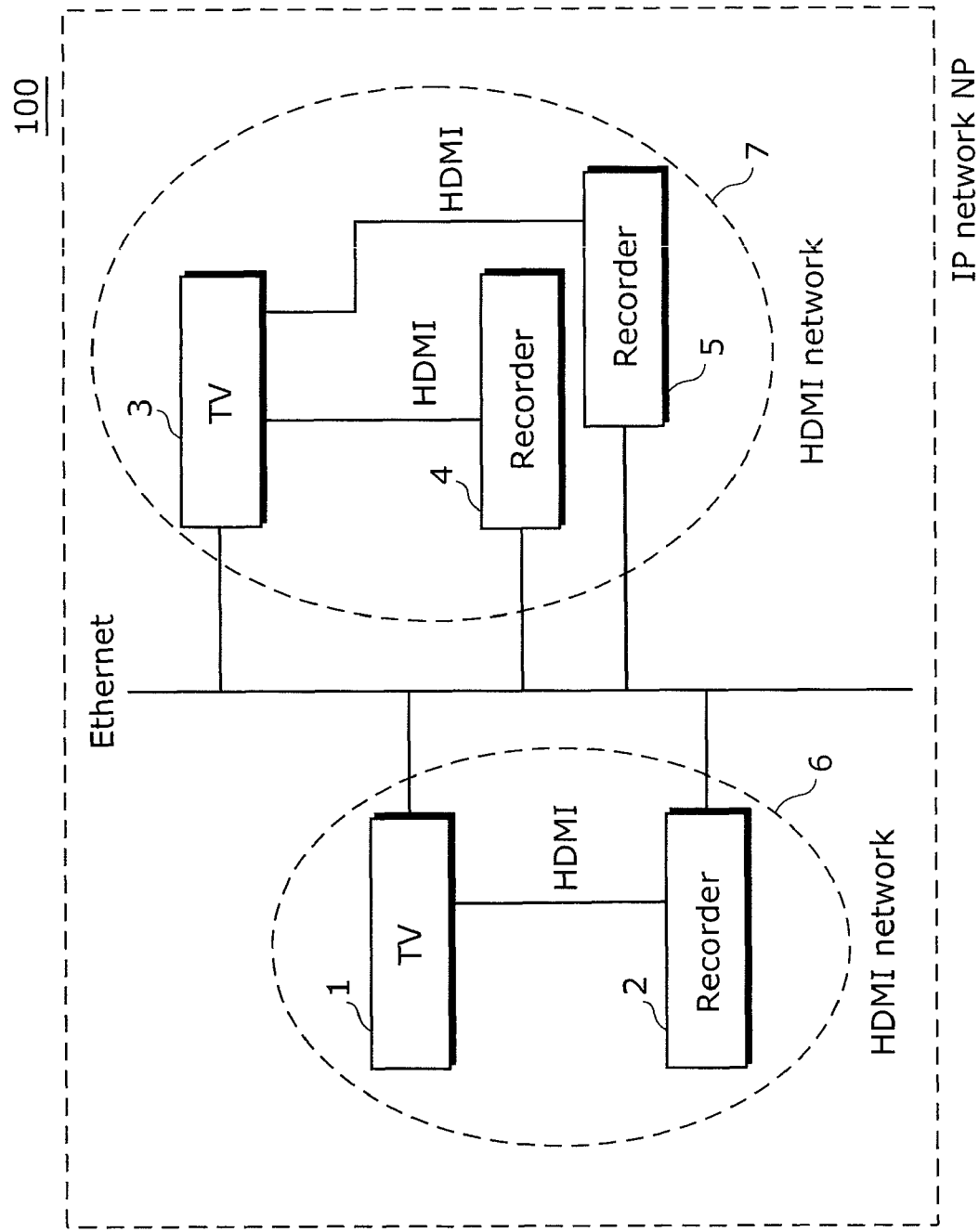
FIG. 3 is a block diagram showing a structure of a network system in accordance with Embodiment of the present invention.

FIG. 3 is a block diagram showing a structure of a network system 100 in accordance with Embodiment of the present invention.

In FIG. 3, a TV 1, used as a control apparatus which has a screen-displaying function and an operating-controlling function, is connected to a recorder 2; namely a terminal apparatus, via an HDMI. The TV 1 and the recorder 2 form an HDMI network 6. Simultaneously, a TV 3; namely another control apparatus, is connected to a recorders 4 and 5; namely terminal apparatuses, via discrete HDMIs. The TV 3 and the recorders 4 and 5 form an HDMI network 7. Furthermore, all the TV 1, the recorder 2, the TV 3, and the recorders 4 and 5 are connected to an IP network NP set up in a house. This makes possible executing mutual communication between the units.

It is noted that the HDMI network 6 is set up, for example, in a bedroom on the second floor, and the HDMI network 7 is set up, for example, in the living room on the ground floor.

Here, the TVs and the recorders are exemplified as the control apparatuses and the terminal apparatuses, respectively; however, the control apparatuses and the terminal apparatuses shall not be limited to these. Other AV apparatuses and home appliances may also be used as the control apparatuses and the terminal apparatuses, respectively.

Figure 4:
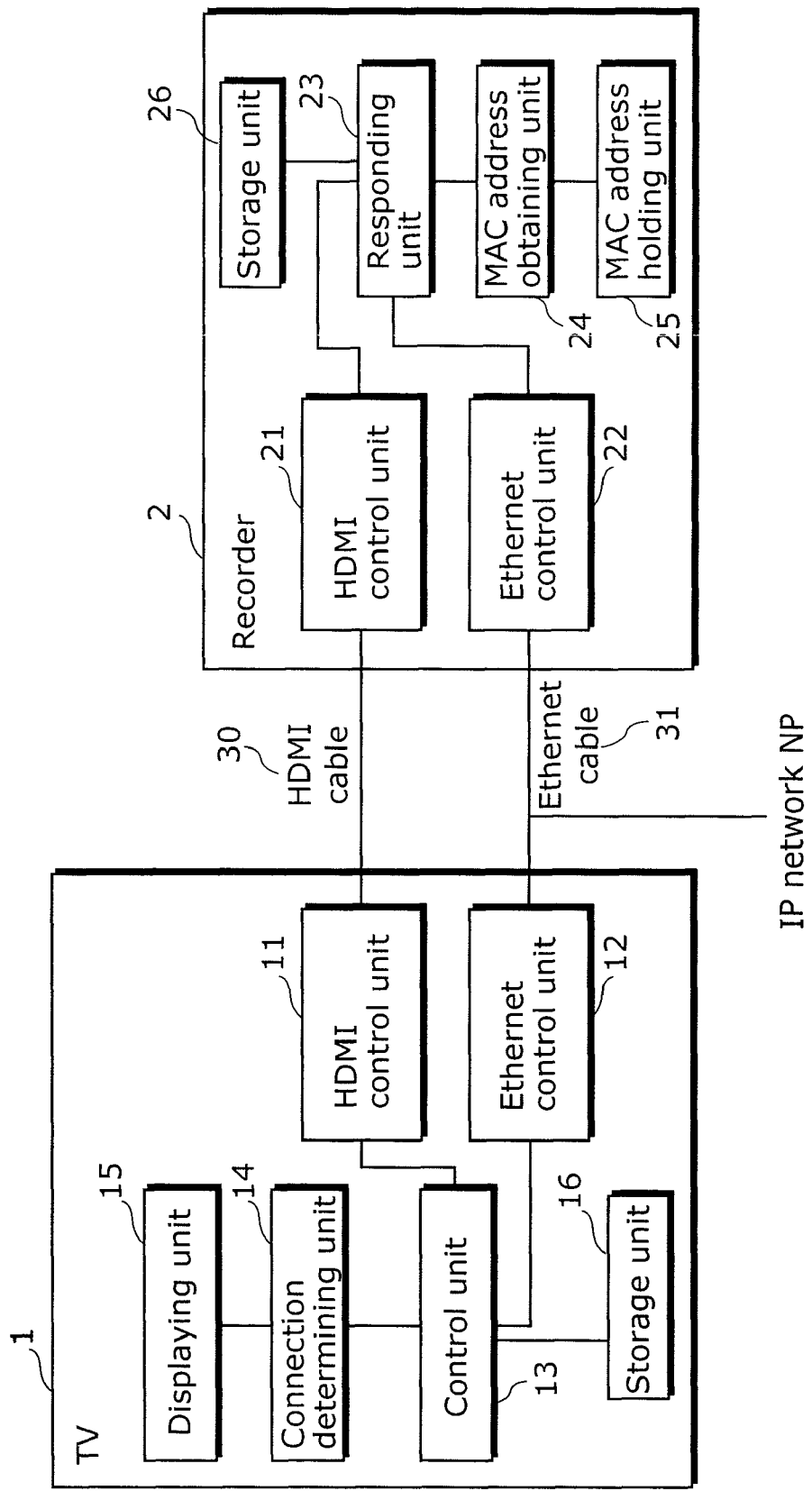
FIG. 4 is a block diagram showing internal structures of apparatuses included in the network system in accordance with Embodiment of the present invention.

FIG. 4 is a block diagram showing internal structures of the apparatuses included in the network system 100 in accordance with Embodiment of the present invention.

In FIG. 4, the TV 1 includes an HDMI control unit 11, an Ethernet (registered trademark) control unit 12, a control unit 13, a connection determining unit 14, a displaying unit 15 and a storage unit 16.

The HDMI control unit 11 includes an HDMI. The HDMI control unit 11 uses the HDMI to handle data communication. The Ethernet (registered trademark) control unit 12 includes an Ethernet (registered trademark) interface. The Ethernet (registered trademark) control unit 12 uses the Ethernet (registered trademark) interface to handle data communication. The control unit 13 and the connection determining unit 14 are arithmetic circuits executing various kinds of processing for a Central Processing unit (CPU). The displaying unit 15 displays characters and images. The storage unit 16 is a memory to store data.

It is noted that both or one of the control unit 13 and the connection determining unit 14 may be built in a form or hardware. Further, both or one of the control unit 13 and the connection determining unit 14 may be a module of a program executed on a computer.

It is noted that the internal structure of the TV 3 in FIG. 3 is identical to that of the TV 1, and thus the details shall be omitted. When several HDMIs are connected to the TV 3, the TV 3 includes either (i) the HDMI control unit 11 having several HDMIs, or (ii) several HDMI control units 11 which are connected to the control unit 13.

The recorder 2 includes an HDMI control unit 21 (or a second transmitting unit), an Ethernet (registered trademark) control unit 22 (or a first transmitting unit), an responding unit 23, a MAC address obtaining unit 24, a MAC address holding unit 25 (or address holding unit), and a storage unit 26.

The HDMI control unit 21 includes an HDMI. The HDMI control unit 21 uses the HDMI to handle data communication. The Ethernet (registered trademark) control unit 22 includes an Ethernet (registered trademark) interface. The Ethernet (registered trademark) control unit 22 uses the Ethernet (registered trademark) interface to handle data communication. The responding unit 23 and the MAC address obtaining unit 24 are arithmetic circuits executing various kinds of processing for a Central Processing unit (CPU).

The MAC address holding unit 25 holds (or stores) a MAC address unique to a corresponding apparatus (the recorder 2, for example). In response to a command from outside, the MAC address obtaining unit 24 obtains the MAC address held in the MAC address holding unit 25. The storage unit 26 is a memory to store data.

It is noted that both or one of the responding unit 23 and the MAC address obtaining unit 24 may be built in a form of hardware. In addition, both or one of the responding unit 23 and the MAC address obtaining unit 24 may be a module of a program executed by the CPU.

The recorder 2 has several functions to be executed, utilizing either the IP network or the HDMI network. The several functions, for example, include reproducing a moving image and dubbing an image. The storage unit 26 is assumed to previously have a data table (referred to as a function data table, hereinafter) indicating information on functions which a corresponding recorder (the recorder 2, for example) has. The function data table stored in the storage unit 26 is assumed to be a function data table DT100.

FIG. 5 exemplifies the function data table DT100. In the function data table DT100, "Function Name" indicates names of the functions which the recorder 2 has. "Reproduction" indicates, for example, a function for reproducing a moving image. "Dubbing" indicates, for example, a function for dubbing an image.

In the function data table DT100, "HDMI" indicates whether or not a corresponding function is executable in the HDMI network. Moreover, "IP" in the function data table DT100 indicates whether or not a corresponding function is executable in the IP network.

The word "Executable" in the function data table DT100 indicates that a corresponding function is executable in a corresponding network. The word "Inexecutable" in the function data table DT100 indicates that a corresponding function is inexecutable in a corresponding network. For example, the function data table DT100 shows that the function under the function name "reproduction" is executable in both of the HDMI network and the IP network. Furthermore, the function data table DT100 shows that the function under the function name "dubbing" is executable only in the HDMI network, and inexecutable in the IP network.

In function data table DT100, when both of the HDMI network and the IP network are available in executing one of the functions, the word "priority" appearing below the word "HDMI" indicates that the HDMI network is used as a priority.

For example, when both of the HDMI network and the IP network are available for a recorder executing a function under the function name "reproduction" (the recorder 2, for example), the function data table DT100 indicates that the recorder uses the HDMI network. It is noted that when both of the HDMI network and the IP network are available, the IP network may also be used as a priority, instead of prioritizing the HDMI network as described above.

The internal structures of the recorders 4 and 5 in FIG. 3 are similar to the internal structure of the recorder 2 in FIG. 4, and the details shall be omitted. It is noted that each of recorders 2, 4, and 5 has several different functions. Specifically, a function data table stored in each storage unit 26 included in an associated one of recorders 2, 4, and 5 shows different information. Here, each of the recorders 2, 4, and 5 may have the same functions.

The HDMI control unit 11 and the HDMI control unit 21 are connected via a HDMI cable 30. The Ethernet (registered trademark) control unit 12 and the Ethernet (registered trademark) control unit 22 are connected via an Ethernet (registered trademark) cable 31. Here, the Ethernet (registered trademark) control unit 12 and the Ethernet (registered trademark) control unit 22 are connected via the Ethernet (registered trademark) cable 31 to the IP network NP set up in the house.

It is noted that the Ethernet (registered trademark) cable appears to directly branch off in FIGS. 3 and 4. Actually, a repeater, such as a hub, is set at a branch point.

Described next is an operation of the network system 100 according to an implementation of the present invention with reference to FIGS. 4 to 7. Here, FIG. 6 exemplifies a flowchart showing a process to determine a connection state of the network system 100 in accordance with Embodiment of the present invention.

In FIG. 4, when either: the TV 1 is powered on; or an apparatus is connected to one of the HDMI included in the HDMI control unit 11, and the Ethernet (registered trademark) interface included in the Ethernet (registered trademark) control unit 12, the control unit 13 starts a search in order to confirm the apparatus connected to the TV 1.

Described next is a flow of a process to determine a connection state with reference to FIGS. 4, 6, and 7.

First, the control unit 13 included in the TV 1 searches for an apparatus connected to the HDMI network via the HDMI control unit 11 (S40). Then, the control unit 13 obtains the MAC address of the apparatus found in the HDMI network (S41).

Figure 7:
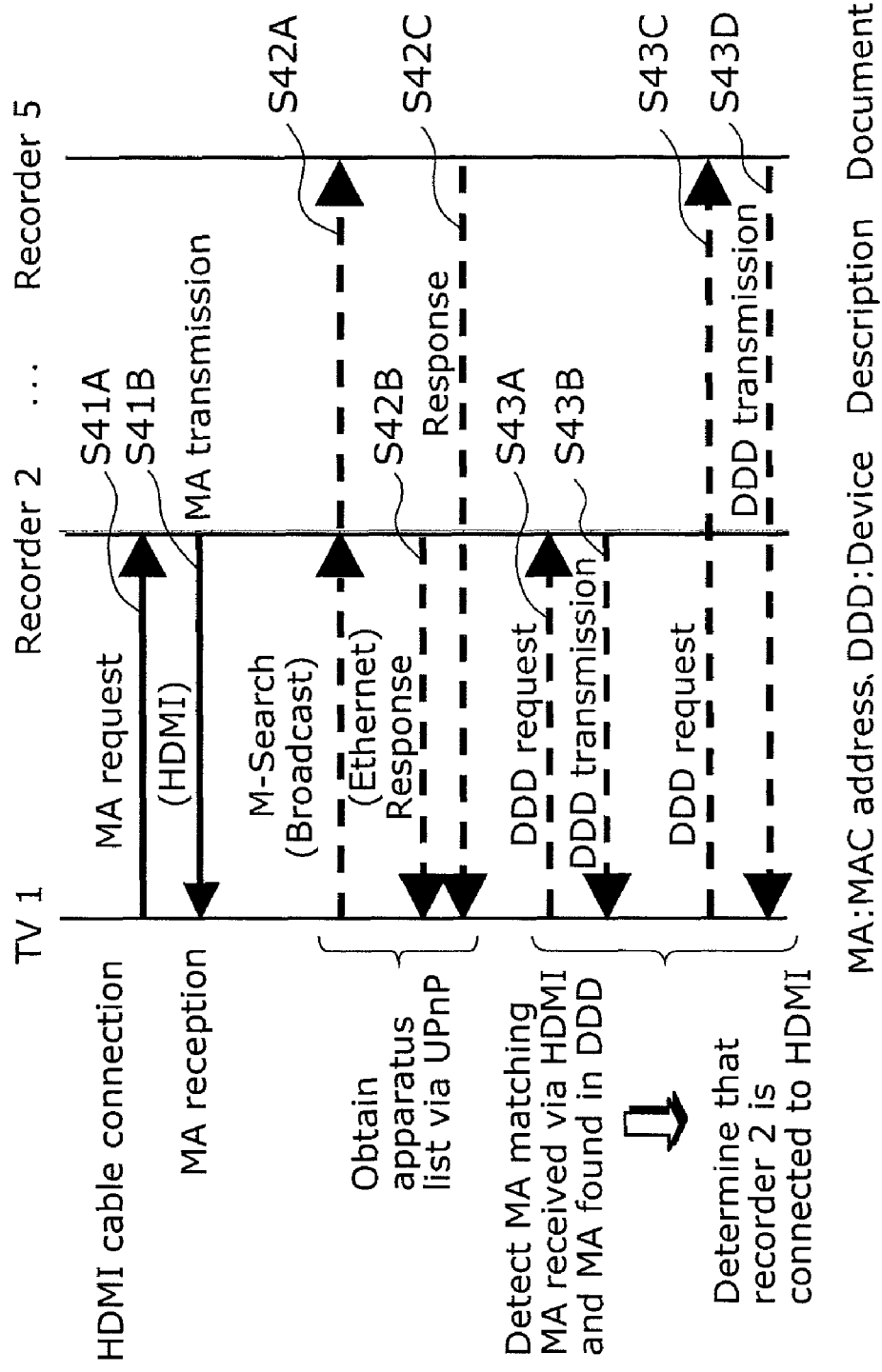
FIG. 7 shows a determination process in accordance with Embodiment of the present invention.

Specifically, as shown in FIG. 7, the control unit 13 transmits a command to the apparatus (the recorder 2, for example) found in the HDMI network through the apparatus search. Here, the command is transmitted via the HDMI control unit 11, and to be used for obtaining the MAC address (MA). Hereinafter, the command used for obtaining a MAC address is referred to as a MAC address obtaining command. The MAC address obtaining command has a definition (description) used for obtaining the MAC address with a help of Consumer Electronics Control (CEC) in the HDMI standard.

In the recorder 2, the responding unit 23 receives the MAC address obtaining command via the HDMI control unit 21. In response to the reception of the MAC address obtaining command, the responding unit 23 gives the MAC address obtaining unit 24 a command for obtaining the MAC address (referred to as an MA obtaining command, hereinafter). Based on the MA obtaining command, the MAC address obtaining unit 24 obtains the MAC address held in the MAC address holding unit 25, and transmits the obtained MAC address to the responding unit 23. Hence, the responding unit 23 obtains the MAC address held in the MAC address holding unit 25.

Then, the responding unit 23 transmits the obtained MAC address to the TV 1 via the HDMI control unit 21 and to the HDMI network (S41B). It is noted that the transmission of the MAC address is conducted, using the above described CEC. Through the above process, the control unit 13 included in the TV 1 receives the MAC address of the recorder 2. Hereinafter, the MAC address received via the HDMI network is also referred to as an HDMI-MAC address. Upon receiving the HDMI-MAC address, the control unit 13 has the storage unit 16 store the HDMI-MAC address.

Figure 6:
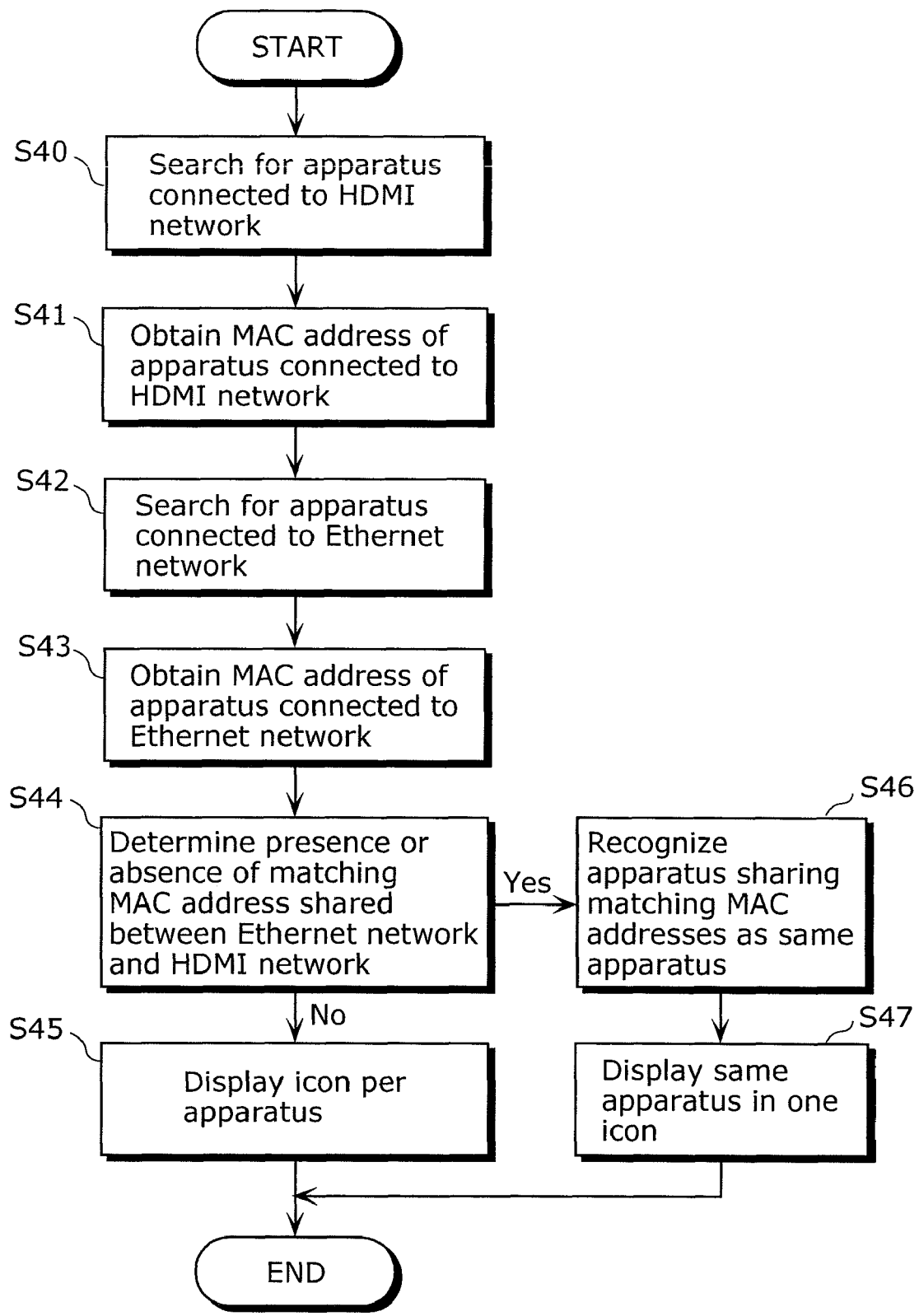
FIG. 6 exemplifies a flowchart showing a process to determine a connection state of the network system in accordance with Embodiment of the present invention.

Then, as shown in FIG. 6, the control unit 13 searches for the apparatus connected to the IP network NP via the Ethernet (registered trademark) control unit 12 (S42).

Specifically, as shown in FIG. 7, the control unit 13 included in the TV 1 broadcasts search commands through the IP network NP in order to detect an apparatus connected to the IP network NP (S42A). This process is referred to as the M-search. The M-Search is achieved, taking advantage of an apparatus detecting scheme with a use of Universal Plug and Play (UPnP).

The recorder 2, receiving the search command through the M-Search, responds to the TV 1 via the IP network NP (S42B). Similar to the recorder 2, the recorder 5 also responds to the TV 1 via the IP network NP (S42C). It is noted that the recorder 4 executes a similar process as the recorder 5 executes, and the details shall be omitted.

Such process allows the control unit 13 included in the TV 1 to: recognize the recorder connected to the IP network NP; and obtain information on listed apparatuses connected to the IP network NP. Hereinafter, the obtained information on listed apparatuses is also referred to as obtained list of information. Here, the obtained list of information intends to indicate the recorders 2, 4, and 5.

Then, as shown in FIG. 6, the control unit 13 obtains the MAC address of the apparatus found in the IP network NP (S43).

Specifically, as shown in FIG. 7, the control unit 13 included in the TV 1 transmits, via the IP network NP, a command requesting the MAC address to each apparatus indicated in the obtained list of information. To be more specific, the control unit 13 included in the TV 1 transmits, via the IP network NP, a command used for obtaining an after-described DDD in the UPnP to each of the apparatuses (the recorder 2, for example) indicated in the obtained list of information (S43A). Hereinafter, the command used for obtaining a DDD is referred to as a DDD obtaining command.

Here, the DDD obtaining command to be transmitted is used for obtaining the MAC address of a destination apparatus. Moreover, the DDD obtaining command to be transmitted is also used for obtaining information on a function which the destination apparatus has.

For the sake of explanation, it is noted here that the recorder 2 is designated as the apparatus of which the control unit 13 included in the TV 1 requests the DDD. In reality, however, nothing is figured out at this moment about the apparatus requesting the DDD but the fact that the apparatus is any given apparatus detected in the IP network NP.

In the recorder 2, the responding unit 23 receives the DDD obtaining command via the IP network NP and the Ethernet (registered trademark) control unit 22. In response to the reception of the DDD obtaining command, the responding unit 23 gives the MAC address obtaining unit 24 a command used for obtaining the MAC address (referred to as an MA obtaining command, hereinafter). Based on the MA obtaining command, the MAC address obtaining unit 24 obtains the MAC address held in the MAC address holding unit 25, and transmits the obtained MAC address to the responding unit 23. Then, the responding unit 23 obtains the MAC address held in the MAC address holding unit 25.

In response to the reception of the DDD obtaining command, the responding unit 23 reads the function data table stored in the storage unit 26.

Based on the obtained MAC address and the information indicated in the read function data table, the responding unit 23 generates the DDD. Here, the read function data table intends to represent the function data table DT100 shown in FIG. 5. The generated DDD intends to represent a DDD 200 described hereinafter.

Figure 8:
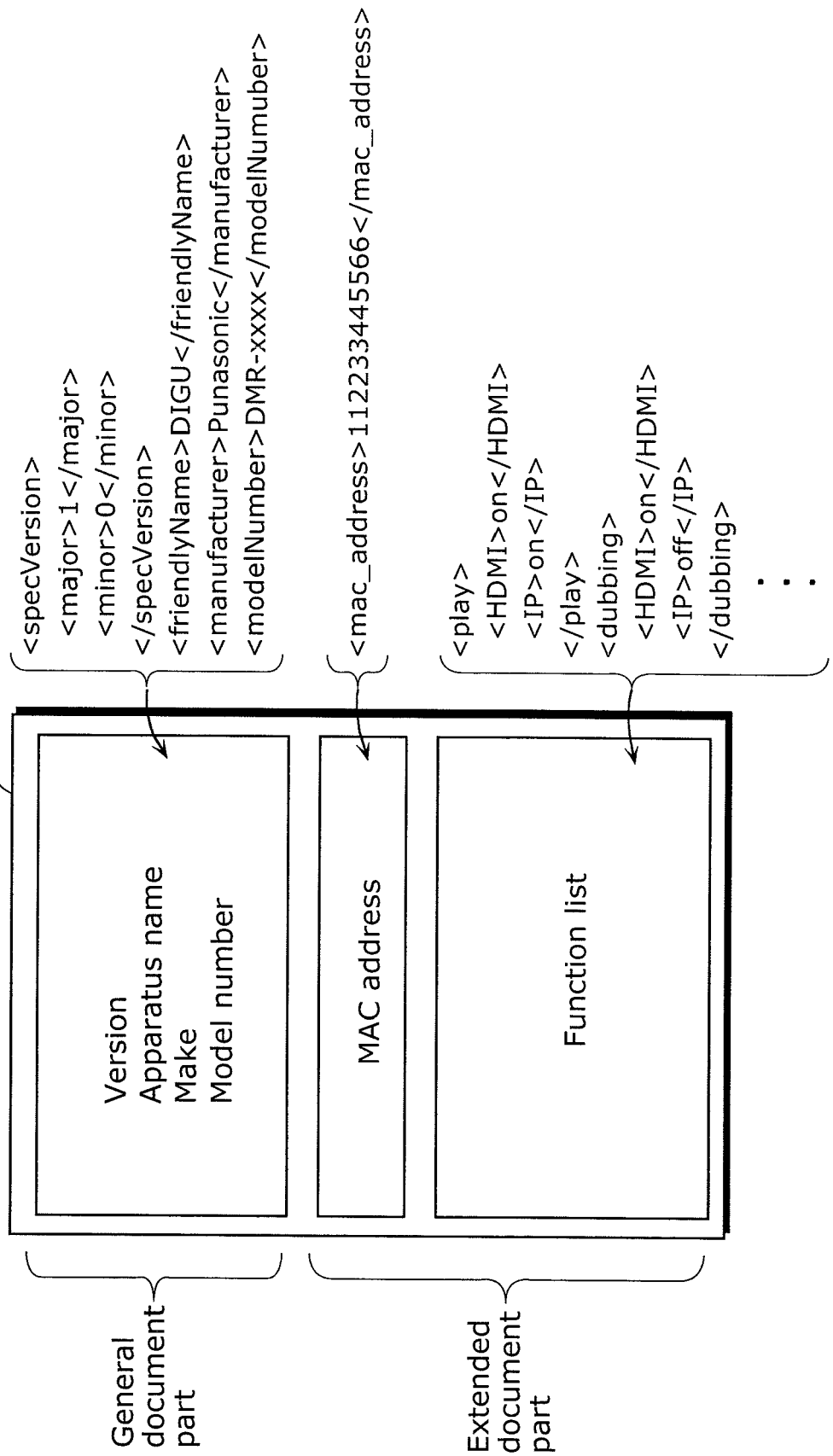
FIG. 8 exemplifies a Device Description Document (DDD).

FIG. 8 exemplifies the DDD 200. The DDD 200 includes a general document part and an extended document part. In the general document part, information on a corresponding recorder apparatus (name and type of a recorder) is described. The extended document part has the MAC address and a function list indicating the information shown in the function data table DT100. The MAC address is obtained by the responding unit 23. Thus, reading the function list makes possible recovering the information shown in the function data table DT100 in FIG. 5. It is noted that the function list includes the information on the prioritized usage of a network described in FIG. 5.

As shown in FIG. 7, in addition, the responding unit 23 transmits the generated DDD to the TV 1 via the Ethernet (registered trademark) control unit 22 and the IP network NP (S43B).

The control unit 13 included in the TV 1 transmits a DDD obtaining command to the recorder 5 indicated in the obtained list of information (43C). The process of transmitting the DDD obtaining command to the recorder 5 is similar to that of transmitting the DDD obtaining command to the recorder 2, and thus the details shall be omitted. Here, the control unit 13 included in the TV 1 transmits a DDD obtaining command to the recorder 4, as well as to the recorder 2.

In response to the reception of the DDD obtaining command, the recorder 5 transmits a DDD to the TV 1 as the recorder 2 has done so (S43D). The DDD transmitted by the recorder 5 has information on the MAC address of the recorder 5 and on the functions which the recorder 5 has. It is noted that the recorder 4 receiving the DDD obtaining command executes a similar process executed by the recorder 5, and thus the details shall be omitted.

Through the above process, the control unit 13 included in the TV 1 receives three DDDs each corresponding to one of the recorders 2, 4, and 5. The control unit 13 associates each of the received three DDDs with a corresponding name of the recorder (a type name, for example), and causes the storage unit 16 to store the DDDs. The DDD which the control unit 13 has received from the recorder 2 is the DDD 200 shown FIG. 8. Described in the DDD 200 are the MAC address of the recorder 2 and the information shown in the function data table DT100 in FIG. 5. In other words, each of the three DDDs received by the control unit 13 has (i) the MAC address of the corresponding recorder, and (ii) the information on the functions which the corresponding recorder has. Hereinafter, the MAC address described in a DDD received by the control unit 13 via the IP network NP is referred to as an IP-MAC address.

Then, the control unit 13 determines whether or not there is an IP-MAC address which matches the HDMI-MAC address (hereinafter referred to as a matching address) by comparing compares the HDMI-MAC address stored in the storage unit 16 with each of the three IP-MAC addresses indicated in an associated one of the three DDDs stored in the storage unit 16 (S44).

When the matching address is found, the connection determining unit 14 determines that an apparatus having the matching address is connected to an associated apparatus (the TV 1) in both of the HDMI network and the IP network NP.

In the example shown in FIG. 7, the control unit 13 determines that the HDMI-MAC address obtained in Step S41B matches the IP-MAC address described in the DDD obtained in Step S43B. In other words, the control unit 13 determines that a matching address is found. The matching address here is the MAC address of the recorder 2. In this case, the connection determining unit 14 determines that the recorder 2 is connected to the TV 1 in both of the HDMI network and the IP network NP.

It is noted that the control unit 13 determines that the HDMI-MAC address obtained in Step S41B does not match the IP-MAC address described in the DDD obtained in Step S43D. In this case, the connection determining unit 14 determines that the recorder 5 is connected to the TV 1 only in the IP network NP. In other words, the connection determining unit 14 determines that the recorder 5 is not connected to the TV 1 in the HDMI network.

When the control unit 13 determines that no matching address is found in Step S44, the connection determining unit 14 determines that there is no apparatus connected to the TV 1 via both of the HDMI network and the IP network NP network. In this case, the displaying unit 15 displays, per apparatus found in both of the HDMI network and the IP network NP, as many icons as the found apparatuses (S45).

For example, assumed here is that the TV 1 is connected to (i) the recorders 2 and 4 in the HDMI network, and (ii) recorders 2 and 5 in the IP network NP. Here, in Step S45, the displaying unit 15 displays (i) two icons of the recorders 2 and 4 corresponding to the HDMI network, and (ii) two icons of the recorders 2 and 5 corresponding to the IP network NP. In other words, the displaying unit 15 displays four icons.

Concurrently, when the control unit 13 determines that the matching address is found, the connection determining unit 14 determines that an apparatus having the matching address is connected to the TV 1 in both of the HDMI network and the IP network NP (S46).

Regarding the apparatus having the matching address, the displaying unit 15 displays an icon corresponding to the apparatus (S47).

For example, assumed here is that the TV 1 is connected to (i) the recorders 2 and 4 in the HDMI network, and (ii) recorders 2 and 5 in the IP network NP. Here, in Step S47, the displaying unit 15 displays an icon of the recorder 4 corresponding to the HDMI network, an icon of the recorder 5 corresponding to the IP network NP, and an icon corresponding to the recorder 2. In other words, the displaying unit 15 displays three icons.

Compared with the process shown in Step S45, the displaying unit 15 displays in Step S47 one icon indicating the recorder 2 having the matching address, instead of the two icons: indicating the recorder 2 having the matching address; and each associated with a corresponding network.

As described above, in Embodiment, the control unit 13 determines whether or not there is a matching address representing a match between the MAC addresses by comparing (i) the MAC address of an apparatus (a recorder, for example) connected to a corresponding apparatus (TV 1) in the HDMI network with (ii) the MAC address of an apparatus connected to a corresponding apparatus (TV 1) in the IP network NP. When the matching address is found, the control unit 13 determines that there is an apparatus having the matching address and connected to the TV 1 in both of the HDMI network and the IP network NP.

Hence, the TV 1 can accurately determine which recorder (apparatus) is connected to the TV 1 itself in both of the HDMI network and the IP network. Thus, an implementation of the present invention successfully determines a connection state between several apparatuses in the case where there are several networks.

It is noted that exemplified above is the process involving obtaining a MAC address via the HDMI network, and then another MAC address via the IP network. The process shall not be limited to this, however. The MAC address may be obtained via the IP network, and then the other MAC address via the HDMI network. Furthermore, both of the MAC addresses may be simultaneously obtained via both of the HDMI network and the IP network. In this case, upon completing the obtainment of the MAC addresses in both of the networks, a determination may be made whether or not the MAC address obtained via the IP network matches the MAC address obtained via the HDMI network.

Described next is how an icon indicating an apparatus is displayed by the displaying unit 15 in the process of Step S47 shown in FIG. 6, exemplifying the case of the TV 1 shown in FIG. 3.

Figure 9:
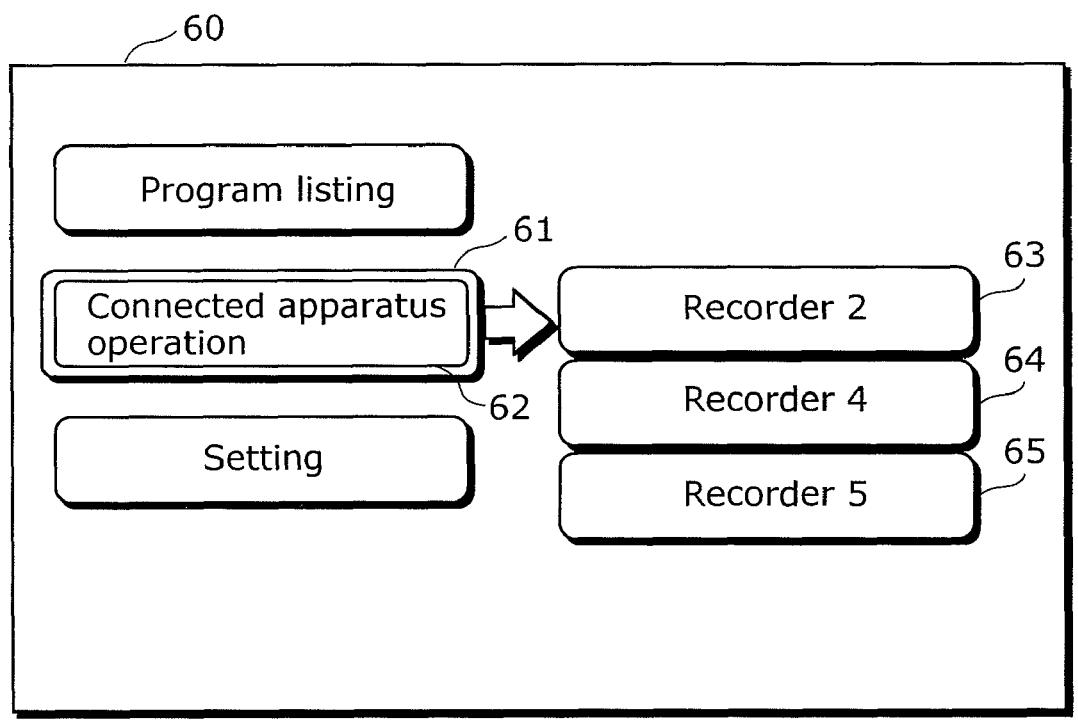
FIG. 9 exemplifies a display picture displayed on a displaying unit.

FIG. 9 exemplifies a display picture 60 displayed on the displaying unit 15.

The display picture 60 in FIG. 9 displays a menu of the TV 1. Assumed here is that the user uses a cursor 61 for selecting an item via a not-shown remote controller to select an icon 62 indicating operating a terminal apparatus. As shown in FIG. 3, the recorder 2 is assumed to be connected to the TV 1 via both of the HDMI network and the IP network NP.

In this case, as shown in FIG. 9, the display picture 60 displays one icon, an icon 63, indicating the recorder 2 having the matching address, instead of two icons: indicating the recorder 2 having the matching address; and each associated with a corresponding network.

Furthermore, icons 64 and 65 are additionally displayed on the display picture 60. The icon 64 indicates the recorder 4 corresponding to the IP network NP and having no matching address. The icon 65 indicates the recorder 5 corresponding to the IP network NP and having no matching address. In other words, the icons 64 and 65 indicate an apparatus found in the IP network NP.

As described above, when the determination is made that an apparatus having a matching address is connected to the TV 1 itself in both of the HDMI network and the IP network NP, the display picture 60 displays, according to the process in Step S47, one icon indicating the recorder 2 having the matching address, instead of two icons: showing the recorder 2 having the matching address; and each corresponding to a respective network.

In other words, when the determination is made that an apparatus having a matching address is connected to the TV 1 itself in both of the HDMI network and the IP network NP, the two icons: showing the recorder 2 having the matching address; and each corresponding to the respective network are prevented from being displayed.

Described next is the process for selecting one of the HDMI network and the IP network NP (hereinafter referred to as a network selecting process), depending on a function to be executed by the apparatus having the matching address, in the case where the apparatus having the matching address is connected to the TV 1 via both of the two networks.

As shown in FIG. 3, assumed here is the case where the recorder 2 is connected to the TV 1 in both of the HDMI network and the IP network NP. In other words, the recorder 2 is an apparatus having a matching address. In addition, the processes in Steps S43A and S43B in FIG. 7 cause the storage unit 16 included in the TV 1 to store the DDD 200 in FIG. 8. Furthermore, the recorder 2 is assumed to execute the reproduction function (the function under the function name "reproduction"). The reproduction function is assumed to generate a moving image. Here, the recorder 2 transmits, to the TV 1 via the HDMI network, information indicating the execution of the reproduction function (hereinafter referred to as executed function information).

Figure 10:
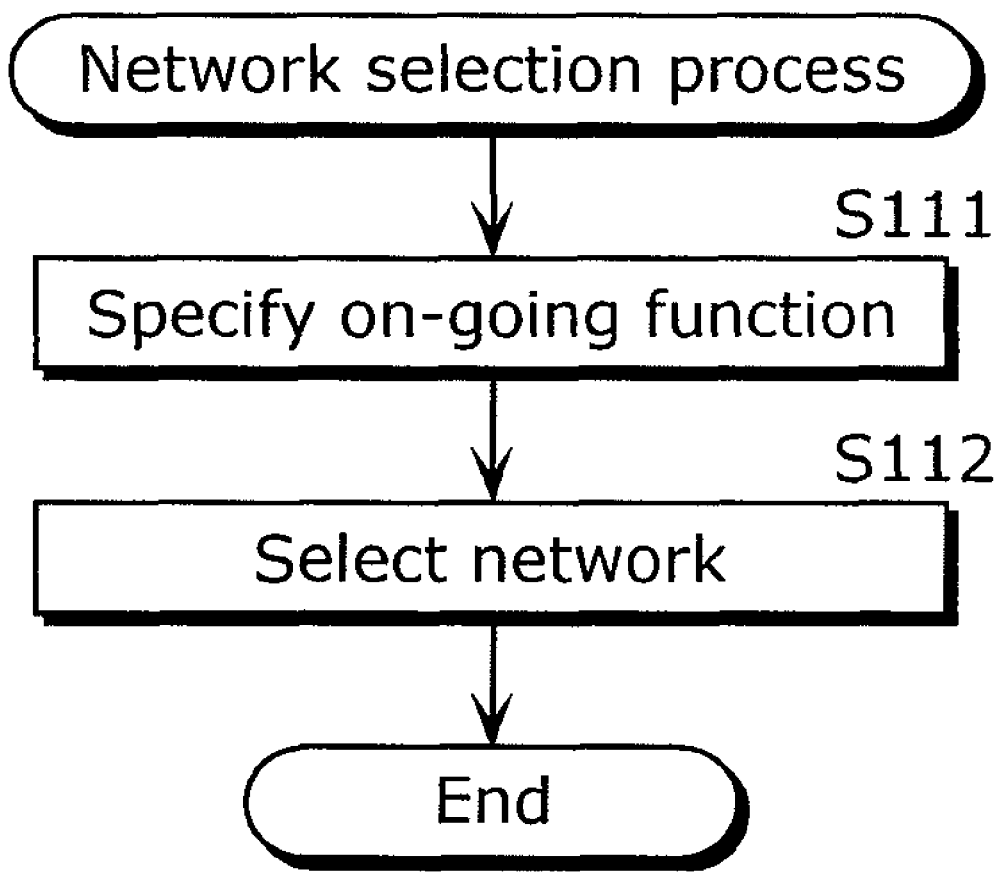
FIG. 10 is a flowchart showing a network selecting process.

FIG. 10 is a flowchart showing a network selecting process. As shown in FIG. 10, first, the control unit 13 receives the executed function information to specify the fact that the on-going function on the recorder 2 is the reproduction function (S111).

Then, based on the function which the recorder 2 is executing (the reproduction function) and the information on priority usage of a network indicated in the DDD 200, stored in the storage unit 16, shown in FIG. 8, the control unit 13 selects one of the HDMI network and the IP network NP (S112).

Here, the information on the priority usage of the network indicated in the DDD 200 intends to represent information indicating the fact that the HDMI network is used as a priority when both of the HDMI network and the IP network are available. In this case, the HDMI network is selected out of the two networks. In other words, the control unit 13 can handle the data communication only via the HDMI network. Specifically, when the recorder 2 executes the reproduction function, the control unit 13 handles data communication with the recorder 2 via the HDMI network.

When the apparatus having the matching address is connected to the TV 1 in both of the HDMI network and the IP network NP, as described above, executing the network selecting process shown in FIG. 10 automatically selects a network which suits a function under execution. This allows the user to operate the TV 1 and the recorder 2, eliminating the need for recognizing functions and connection states of apparatuses set in a house, which improves usability and operability for the user.

When the recorder 2 is connected to the TV 1 in both of the HDMI network and the IP network NP, the recorder 2 is assumed to execute the dubbing function (the function under the function name "dubbing"). Here, when executing the network selecting process, the control unit 13 selects the HDMI network out of the two networks according to the information shown in the function data table DT100 in FIG. 5 indicated in the DDD 200, stored in the storage unit 16, shown in FIG. 8, (S112).

Assumed as well is a case where there is a function-wise difference depending on the connection state in the networks such that, among several recorders, a recorder is capable of dubbing via the HDMI network, while another recorder is incapable of dubbing via the IP network. Even in this case, the control unit 13 executes the network selecting process to automatically select a desired network. Thus, the user is free from troublesome tasks such as: recognizing a connection state and a function-wise difference due to the connection state; and remembering the connection state and the difference.

Embodiment has described the process of selecting a network according to a function which the recorder 2 is executing; meanwhile, the process shall not be limited to this. For example, as far as an apparatus connected to the TV 1 in both of the HDMI network and the IP network NP is concerned, the connection determining unit 14 previously holds information indicating which network is used as a priority (hereinafter referred to as priority information), regardless of the on-going function. The priority information is, for example, network priority usage information indicated in the DDD 200 in FIG. 8.

Then, when the user selects the icon 63 shown in FIG. 9, the control unit 13 refers to the previously held priority information to select one of the HDMI control unit 11 and the Ethernet (registered trademark) control unit 12, and transmits controlling information to the recorder 2 via one of the selected HDMI control unit 11 and the Ethernet (registered trademark) control unit 12.

In other words, since the TV 1 previously holds the priority information indicating which network; namely the HDMI network or the IP network, has a priority, the TV 1 can automatically switch between the HDMI network and the IP network for receiving an input according to an icon selected by the user in the case where the user selects the icon on the screen of the TV 1. This allows the user to operate each apparatus connected via a network, using a control apparatus (the TV 1, for example), eliminating the need for recognizing functions and connection states of each apparatus, which improves usability and operability for the user.

In Embodiment, the responding unit 23 intends to provide the MAC address alone, meanwhile, the responding unit 23 may additionally provide various information indicating the performance of the recorder 2, such as valid/invalid functions in a corresponding format and a network, so that the TV 1 can utilize the various information to determine the switching.

It is noted that the present invention may also be implemented as a program which causes a computer to execute each step shown in the flowcharts shown in FIGS. 6 and 10. In addition, the present invention may be implemented as a computer-readable recording medium which stores the program, and as an integrated circuit.

The embodiment disclosed above is exemplary in all respects, and shall not be limitative. The scope of the present invention shall be intended to (i) be described in CLAIMS, not in the above Description, and (ii) include all the modifications within the scope of the present invention.

INDUSTRIAL APPLICABILITY

In the present invention, a control apparatus, including a TV having a screen-displaying function and an operating function, determines a connection state of another apparatus connected to the control apparatus itself in a structure which the control apparatus is connected, in the IP network and the HDMI network, to (i) a home appliance and (ii) several AV apparatuses, including a video, a player, a recorder, and an audio device. Thus, the present invention is useful in a system which the control apparatus switches, based on the determination result, between the uses of one of an IP network and an HDMI network in connecting the other apparatus.

The invention claimed is:

1. A network system including a control apparatus and one or more terminal apparatuses which are connected via a High Definition Multimedia Interface (HDMI) network, the control apparatus being connected to at least one of the one or more terminal apparatuses via another network which is different from the HDMI network,
wherein the control apparatus comprises:
a first address obtaining unit configured to obtain an apparatus address via the other network, the apparatus address obtained via the other network representing an address of an apparatus connected to the other network;
a second address obtaining unit configured to obtain an apparatus address via the HDMI network, the apparatus address obtained via the HDMI network representing an address of the at least one terminal apparatus connected to the HDMI network;
an address determining unit configured to determine whether or not a matching address is found by comparing (i) the apparatus address obtained by the first address obtaining unit with (ii) the apparatus address obtained by the second address obtaining unit, the matching address representing a match between the apparatus addresses obtained by the first and second address obtaining units; and
a connection determining unit configured to determine that a terminal apparatus, of the one or more terminal apparatuses, having the matching address is connected to the control apparatus via both of the other network and the HDMI network, when the address determining unit determines that the matching address is found,
wherein each of the one or more terminal apparatuses includes functions to be executed via one of the other network and the HDMI network,
wherein each of the one or more terminal apparatuses comprises:
an address holding unit configured to hold an apparatus address corresponding to each of the one or more terminal apparatuses;
a first transmitting unit configured to transmit the apparatus address and function information to the control apparatus via the other network in response to a request from the control apparatus, the apparatus address to be transmitted by the first transmitting unit being held in the address holding unit, and the function information indicating which one of the other network and the HDMI network is used as a priority for each of the functions which included in each of the one or more terminal apparatuses; and
a second transmitting unit configured to transmit the apparatus address to the control apparatus via the HDMI network in response to a request from the control apparatus, the apparatus address to be transmitted by the second transmitting unit being held in the address holding unit,
wherein the first address obtaining unit is further configured to obtain from each of one or more terminal apparatuses the function information corresponding to an associated one of the one or more terminal apparatuses,
wherein the control apparatus further comprises:
a storage unit configured to store the function information obtained by the first address obtaining unit; and
a selective communicating unit configured to: select one of the other network and the HDMI network according to a function executed by the terminal apparatus having the matching address and the function information corresponding to the terminal apparatus having the matching address; and communicate with the terminal apparatus having the matching address via the selected one of the other network and the HDMI network, when the address determining unit determines that the matching address is found, and
wherein the other network and the HDMI network are identified in the function information, and the selected one of the other network and the HDMI network is prioritized for use.

2. The network system according to claim 1, wherein the other network is an Internet Protocol (IP) network.

3. The network system according to claim 1, wherein the apparatus address is a Media Access Control (MAC) address.

4. A control apparatus which is connected to (i) one or more terminal apparatuses via a High Definition Multimedia Interface (HDMI) network, and (ii) at least one of the one or more terminal apparatuses via another network which is different from the HDMI network, the one or more terminal apparatuses having functions executed via one of the HDMI network and the other network, and the control apparatus comprising:
a first address obtaining unit configured to obtain an apparatus address via the other network, the apparatus address obtained via the other network representing an address of an apparatus connected to the other network;
a second address obtaining unit configured to obtain an apparatus address via the HDMI network, the apparatus address obtained via the HDMI network representing an address of the at least one terminal apparatus connected to the HDMI network;
an address determining unit configured to determine whether or not a matching address is found by comparing (i) the apparatus address obtained by the first address obtaining unit with (ii) the apparatus address obtained by the second address obtaining unit, the matching address representing a match between the apparatus addresses obtained by the first and second address obtaining units; and a connection determining unit configured to determine that a terminal apparatus, of the one or more terminal apparatuses, having the matching address is connected to the control apparatus via both of the other network and the HDMI network, when the address determining unit determines that the matching address is found, wherein the first address obtaining unit is further configured to obtain, from each of one or more terminal apparatuses, function information indicating that one of the other network and the HDMI network is used as a priority for each of the functions included in each of the one or more terminal apparatuses, wherein the control apparatus further comprises:
 a storage unit configured to store the function information obtained by the first address obtaining unit; and
 a selective communicating unit configured to: select one of the other network and the HDMI network according to a function executed by the terminal apparatus having the matching address and the function information corresponding to the terminal apparatus having the matching address; and communicate with the terminal apparatus having the matching address via the selected one of the other network and the HDMI network, when the address determining unit determines that the matching address is found, and wherein the other network and the HDMI network are identified in the function information, and the selected one of the other network and the HDMI network is prioritized for use.

5. The control apparatus according to claim 4, wherein the other network is an Internet Protocol (IP) network.

6. The control apparatus according to claim 4, wherein the apparatus address is a Media Access Control (MAC) address.

7. A terminal apparatus which (i) is connected to an external apparatus via a High Definition Multimedia Interface (HDMI) network and another network which is different from the HDMI network, and (ii) includes functions to be executed via one of the other network and the HDMI network, the terminal apparatus comprising:

an address holding unit configured to hold an apparatus address of the terminal apparatus;

a first transmitting unit configured to transmit the apparatus address and function information to the external apparatus via the other network in response to a request from the external apparatus, the apparatus address being held in the address holding unit, and the function information indicating which one of the other network and the HDMI network is used as a priority for each of the functions included in the terminal apparatus; and a second transmitting unit configured to transmit the apparatus address to the external apparatus via the HDMI network in response to a request from the external apparatus, the apparatus address being held in the address holding unit, wherein the other network and the HDMI network are identified in the function information, and a selected one of the other network and the HDMI network is prioritized for use.

8. The terminal apparatus according to claim 7, wherein the other network is an Internet Protocol (IP) network.

9. The terminal apparatus according to claim 7, wherein the apparatus address is a Media Access Control (MAC) address.

10. A method for determining a connection state in a network system in which a control apparatus and one or more terminal apparatuses are connected via a High Definition Multimedia Interface (HDMI) network, the control apparatus being connected to at least one of the one or more terminal apparatuses via another network which is different from the HDMI network, each of the one or more terminal apparatuses including functions to be executed via one of the other network and the HDMI network, and the method for determining the connection state comprising:

first obtaining an apparatus address by the control apparatus via the other network, the apparatus address obtained via the other network representing an address of an apparatus connected to the other network; and second obtaining an apparatus address by the control apparatus via the HDMI network, the apparatus address obtained via the HDMI network representing an address of the at least one terminal apparatus connected to the HDMI network, wherein the first obtaining includes obtaining, by the control apparatus, from each of one or more terminal apparatuses function information indicating which one of the other network and the HDMI network is used as a priority to each of the functions included in the terminal apparatus, and wherein the method for determining the connection state further comprises:

determining, by the control apparatus, whether or not a matching address is found by comparing (i) the apparatus address obtained in the first obtaining with (ii) the apparatus address obtained in the second obtaining, the matching address representing a match between the apparatus addresses obtained by the first obtaining and the second obtaining;

determining, by the control apparatus, that a terminal apparatus, of the one or more terminal apparatuses, having the matching address is connected to the control apparatus via both of the other network and the HDMI network, when the matching address is found by the determining of whether or not the matching address is found; and when the determining determines that the matching address is found, selecting, by the control apparatus, one of the other network and the HDMI network according to a function to be executed by the terminal apparatus having the matching address and the obtained function information corresponding the terminal apparatus having the matching address, and communicating, by the control apparatus, with the terminal apparatus having the matching address via the selected one of the other network and the HDMI network, wherein the other network and the HDMI network are identified in the function information, and the selected one of the other network and the HDMI network is prioritized for use.

11. The method for determining a connection state according to claim 10, wherein the other network is an Internet Protocol (IP) network.

12. The method for determining a connection state according to claim 10, wherein the apparatus address is a Media Access Control (MAC) address.

* * * * *